(12) United States Patent
Baba (10) Patent No.: US 10,442,430 B2
(45) Date of Patent: Oct. 15, 2019

(54) COLLISION AVOIDANCE ASSISTANCE DEVICE

(71) Applicant: DENSO CORPORATION, Kariya, Aichi-pref. (JP)

(72) Inventor: Takahiro Baba, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 54 days.

(21) Appl. No.: 15/562,177

(22) PCT Filed: Mar. 18, 2016

(86) PCT No.: PCT/JP2016/058680
§ 371 (c)(1),
(2) Date: Sep. 27, 2017

(87) PCT Pub. No.: WO2016/158491
PCT Pub. Date: Oct. 6, 2016

(65) Prior Publication Data
US 2018/0086337 A1    Mar. 29, 2018

(30) Foreign Application Priority Data

Apr. 2, 2015  (JP) ................................. 2015-075827

(51) Int. Cl.
*G06K 9/00*        (2006.01)
*G06K 9/78*        (2006.01)
(Continued)

(52) U.S. Cl.
CPC ............... *B60W 30/09* (2013.01); *B60T 7/22* (2013.01); *B60T 8/17558* (2013.01);
(Continued)

(58) Field of Classification Search
CPC ............ B60W 30/09; B60W 2420/42; B60W 2420/52; B60W 2710/20; B60W 2550/10;
(Continued)

(56) References Cited

U.S. PATENT DOCUMENTS

2005/0137774 A1 * 6/2005 Rupp ................. B60K 31/0008
701/96
2006/0103927 A1   5/2006 Samukawa et al.
(Continued)

FOREIGN PATENT DOCUMENTS

JP    11-203458 A     7/1999
JP    H11-266450      9/1999
(Continued)

*Primary Examiner* — Jon Chang
(74) *Attorney, Agent, or Firm* — Knobbe, Martens, Olson & Bear, LLP (57) ABSTRACT

A collision avoidance assistance device includes: a target detection unit for detecting a target; a process execution unit for executing a collision avoidance assistance process in the case where it is determined that the target satisfies an execution condition; an image recognition unit for recognizing a target in an image; a position P acquisition unit for acquiring a position P, in a vertical direction, of the target; a size RS estimation unit for estimating an actual size RS of the target; and an execution condition setting unit for setting the execution condition to be stricter in the case where the following conditions J1 and J2 are satisfied or the following conditions J3 and J4 are satisfied than in other cases: (Condition J1) in the image, the position P is below a range $\alpha$; (Condition J2) the size RS is smaller than a range $\beta$; (Condition J3) in the image, the position P is above the range $\alpha$; and (Condition J4) the size RS is larger than the range $\beta$.

11 Claims, 6 Drawing Sheets

(51) Int. Cl.

| | | |
|---|---|---|
| *G01S 13/86* | (2006.01) | |
| *G01S 13/93* | (2006.01) | |
| *G08G 1/16* | (2006.01) | |
| *B60W 30/09* | (2012.01) | |
| *B60W 30/095* | (2012.01) | |
| *B60W 10/18* | (2012.01) | |
| *G06T 7/70* | (2017.01) | |
| *G06T 7/60* | (2017.01) | |
| *G01S 7/40* | (2006.01) | |
| *B60T 8/1755* | (2006.01) | |
| *B60W 30/085* | (2012.01) | |
| *B60T 7/22* | (2006.01) | |

(52) U.S. Cl.
CPC .......... *B60W 10/18* (2013.01); *B60W 30/085* (2013.01); *B60W 30/095* (2013.01); *G01S 7/40* (2013.01); *G01S 13/867* (2013.01); *G01S 13/931* (2013.01); *G06K 9/00805* (2013.01); *G06K 9/78* (2013.01); *G06T 7/60* (2013.01); *G06T 7/70* (2017.01); *G08G 1/16* (2013.01); *G08G 1/166* (2013.01); *B60T 2201/022* (2013.01); *B60W 2420/42* (2013.01); *B60W 2420/52* (2013.01); *B60W 2550/10* (2013.01); *B60W 2710/18* (2013.01); *B60W 2710/20* (2013.01); *G01S 2007/4034* (2013.01); *G01S 2013/9346* (2013.01); *G01S 2013/9375* (2013.01); *G06K 2209/21* (2013.01); *G06T 2207/30261* (2013.01)

(58) Field of Classification Search
CPC .......... B60W 2710/18; B60W 30/095; B60W 30/085; B60W 10/18; G06T 7/60; G06T 7/70; G06T 2207/30261; G08G 1/16; G08G 1/166; B60T 2201/022; B60T 7/22; B60T 8/17558; G01S 2007/4034; G01S 2013/9375; G01S 2013/9346; G01S 7/40; G01S 13/867; G01S 13/931; G06K 2209/21; G06K 9/78; G06K 9/00805

See application file for complete search history.

(56) References Cited

U.S. PATENT DOCUMENTS

| | | |
|---|---|---|
| 2008/0144888 A1 | 6/2008 | Sano et al. |
| 2011/0006941 A1 | 1/2011 | Samukawa et al. |
| 2012/0288150 A1* | 11/2012 | Kido .................... G06K 9/2018 382/103 |
| 2015/0298621 A1* | 10/2015 | Katoh .................... B60R 11/04 348/148 |
| 2016/0003936 A1 | 1/2016 | Hibino |
| 2016/0011307 A1* | 1/2016 | Casse .................... G01S 13/931 701/93 |
| 2016/0054452 A1* | 2/2016 | Cosatto .................... G01S 19/51 701/412 |

FOREIGN PATENT DOCUMENTS

| | | |
|---|---|---|
| JP | 2008-186384 A | 8/2008 |
| JP | 2011-17634 A | 1/2011 |
| JP | 2014-164461 A | 9/2014 |

* cited by examiner

COLLISION AVOIDANCE ASSISTANCE DEVICE

TECHNICAL FIELD

The present invention relates to a collision avoidance assistance device.

BACKGROUND ART

A technique has been conventionally known in which a target ahead of the own vehicle is detected with the use of a millimeter wave radar and in the case where the target thus detected satisfies a predetermined condition, a collision avoidance assistance process such as an alarm is executed. Among the targets, road structures such as manhole covers can be easily passed over by the own vehicle, and thus, the road structure does not require execution of the collision avoidance assistance process. According to a technique described in Patent Literature 1, a height of a target from a road surface is estimated from characteristics of a reflected wave of a millimeter wave radar, and based on the result of the estimation, a road structure and a target which requires the collision avoidance assistance process are distinguished.

CITATION LIST

Patent Literature

[PTL 1] JP 2011-17634 A

SUMMARY OF THE INVENTION

Technical Problem

Depending on a slope of a road on which the own vehicle and a target are present, it is difficult to accurately distinguish whether a detected target is a road structure. Consequently, an unnecessary collision avoidance assistance process may be executed with respect to the road structure. The present invention has been made in view of such a problem, and an object of the present invention is to provide a collision avoidance assistance device capable of suppressing execution of an unnecessary collision avoidance assistance process.

Solution to Problem

A collision avoidance assistance device of the present invention includes: a target detection unit for detecting a target ahead of the own vehicle; a determination unit for determining whether the target which has been detected by the target detection unit satisfies a predetermined execution condition; a process execution unit for executing a collision avoidance assistance process in the case where the determination unit determines that the target satisfies the execution condition; an image acquisition unit for acquiring an image ahead of the own vehicle; an image recognition unit for recognizing a target in the image; a position P acquisition unit for acquiring a position P, in a vertical direction in the image, of the target which has been recognized by the image recognition unit; a size RS estimation unit for estimating, from the position P and a size S, in the image, of the target which has been recognized by the image recognition unit, an actual size RS of the target which has been recognized by the image recognition unit; and an execution condition setting unit for setting the execution condition to be stricter in the case where the following conditions J1 and J2 are satisfied or the following conditions J3 and J4 are satisfied than in other cases: (Condition J1) in the image, the position P is below a range $\alpha$ of positions in the vertical direction in the image which range $\alpha$ is set in advance; (Condition J2) the size RS is smaller than a range $\beta$ whose size is set in advance; (Condition J3) in the image, the position P is above the range $\alpha$; and (Condition J4) the size RS is larger than the range $\beta$.

Advantageous Effects of the Invention

According to the collision avoidance assistance device of the present invention, in the case where the target detected by the target detection unit is highly likely to be an overhead structure (in the case where the conditions J1 and J2 are satisfied) and in the case where the target detected by the target detection unit is highly likely to be a road structure (in the case where the conditions J3 and J4 are satisfied), the execution condition for executing the collision avoidance assistance process is set to be stricter. This makes it possible to suppress execution of an unnecessary collision avoidance assistance process.

DESCRIPTION OF THE EMBODIMENTS

The following description will discuss an embodiment of the present invention with reference to drawings.

First Embodiment

1. Configuration of Collision Avoidance Assistance Device 1

Figure 1:
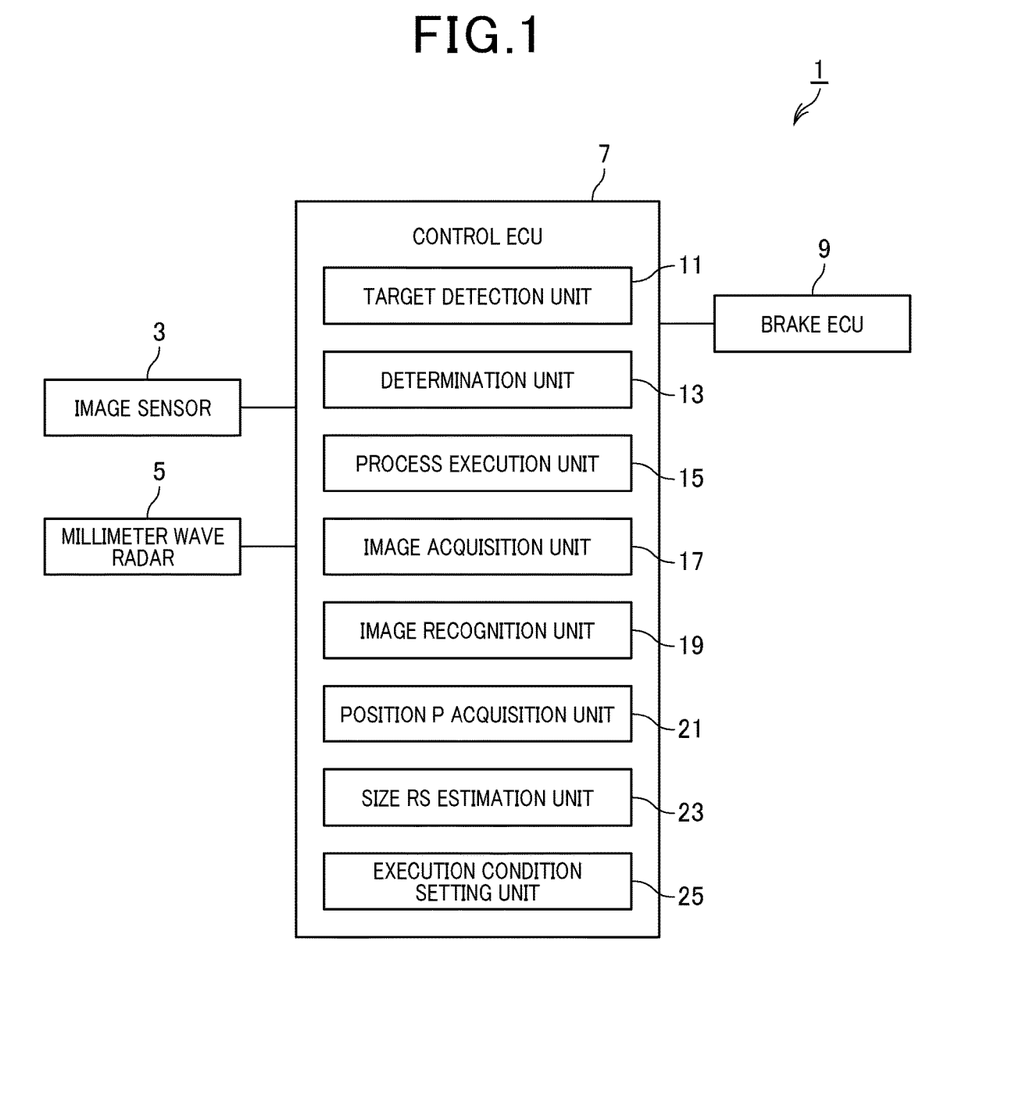
FIG. 1 is a block diagram illustrating a configuration of a collision avoidance assistance device 1.

With reference to FIG. 1, the following description will discuss a configuration of a collision avoidance assistance device 1. The collision avoidance assistance device 1 is a vehicle-mounted device which is provided in a vehicle. Hereinafter, a vehicle equipped with the collision avoidance assistance device 1 is referred to as the own vehicle. The collision avoidance assistance device 1 includes an image sensor 3, a millimeter wave radar 5, a control ECU 7, and a brake ECU 9.

The image sensor 3 generates an image by photographing a scene ahead of the own vehicle. The millimeter wave radar 5 detects a target (e.g., another vehicle, pedestrian, roadside object, obstacle, or the like) ahead of the own vehicle by transmitting and receiving a frequency-modulated radar wave in a millimeter wave band. The millimeter wave radar 5 is capable of measuring a distance from the own vehicle to the target and specifying a direction of the target relative to the own vehicle.

The control ECU 7 is a publicly known computer including a CPU, a RAM, a ROM, and the like. The control ECU 7 executes a process (described later) by a program stored in the ROM. The control ECU 7 includes, as functions, a target detection unit 11, a determination unit 13, a process execution unit 15, an image acquisition unit 17, an image recognition unit 19, a position P acquisition unit 21, a size RS estimation unit 23, and an execution condition setting unit 25. Functions of each unit will be described later.

The brake ECU 9 is a publicly known computer including a CPU, a RAM, a ROM, and the like. The brake ECU 9 executes a process (described later) by executing a program stored in the ROM. That is, when the brake ECU 9 receives an execution instruction (described later) from the control ECU 7, the brake ECU 9 executes a process of automatic braking. The automatic braking is an example of a collision avoidance assistance process.

2. Process Executed by Collision Avoidance Assistance Device 1

(2-1) Execution Determination Process

Figure 2:
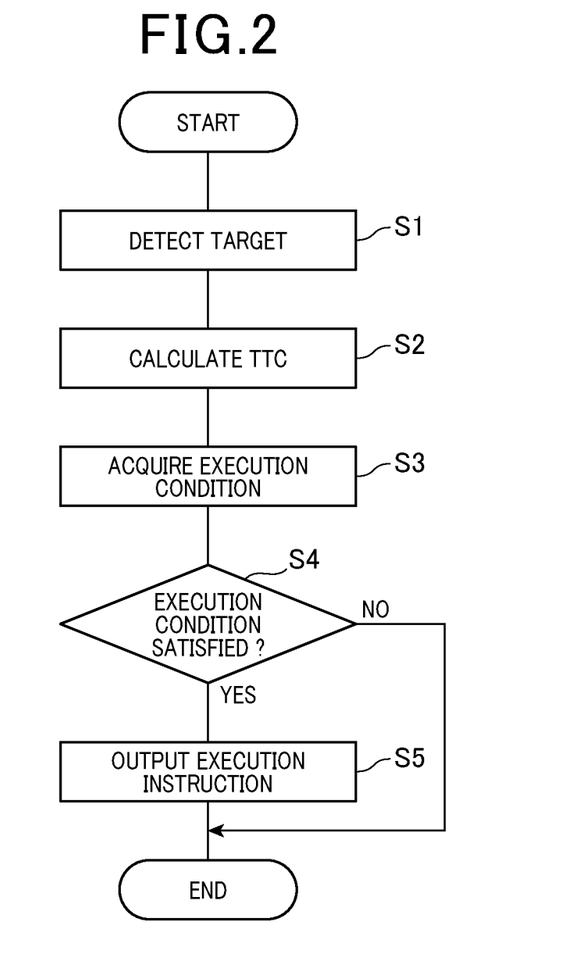
FIG. 2 is a flowchart showing an execution determination process which is executed by the collision avoidance assistance device 1.

With reference to FIG. 2, the following description will discuss an execution determination process which is repeatedly executed by the collision avoidance assistance device 1 (in particular, the control ECU 7) at predetermined time intervals. In step S1 in FIG. 2, the target detection unit 11 detects a target ahead of the own vehicle with the use of the millimeter wave radar 5.

In step S2, the determination unit 13 repeatedly calculates time to collision (TTC) of the target detected in the step S1. The TTC is a value obtained by dividing a distance D from the own vehicle to the target by a relative speed V of the target to the own vehicle. The determination unit 13 acquires the distance D and the relative speed V from a result of the detection performed with the use of the millimeter wave radar 5 and calculates the TTC by using the distance D and the relative speed V thus acquired.

In step S3, the determination unit 13 acquires an execution condition which has been set at that point. The execution condition is a condition that "when TTC is acquired multiple times, a rate r of acquisition of TTC whose value is not more than a reference value I is not less than a rate threshold R." The execution condition is set in an execution condition setting process (described later).

In step S4, the determination unit 13 determines whether the TTC acquired multiple times in the step S2 satisfies the execution condition acquired in the step S3. That is, the determination unit 13 calculates the rate r for the TTC acquired multiple times in the step S2 and determines whether the rate r is not less than the rate threshold R.

For example, in the case where N indicates the total number of TTC acquired in the step S2 and N1 indicates, among the total number of TTC, the number of TTC whose value is not more than the reference value I, the rate r is indicated by N1/N. The determination unit 13 determines whether N1/N is not less than the rate threshold R.

In the case where the determination unit 13 determines that the execution condition is satisfied, the process proceeds to step S5. In the case where the determination unit 13 determines that the execution condition is not satisfied, the process is ended.

In the step S5, the process execution unit 15 outputs an execution instruction. As described above, when the brake ECU 9 receives the execution instruction, the brake ECU 9 executes the process of automatic braking.

(2-2) Execution Condition Setting Process

With reference to FIGS. 3 to 8, the following description will discuss the execution condition setting process which is repeatedly executed by the collision avoidance assistance device 1 (in particular, the control ECU 7) at the predetermined time intervals. In step S11 in FIG. 3, the image acquisition unit 17 acquires an image ahead of the own vehicle with the use of the image sensor 3. A vertical direction in the image coincides with an actual vertical direction in a scene which has been photographed. That is, a target which is located in an upper part of the scene is also located in an upper part of the image, and a target which is located in a lower part of the scene is also located in a lower part of the image.

Figure 3:
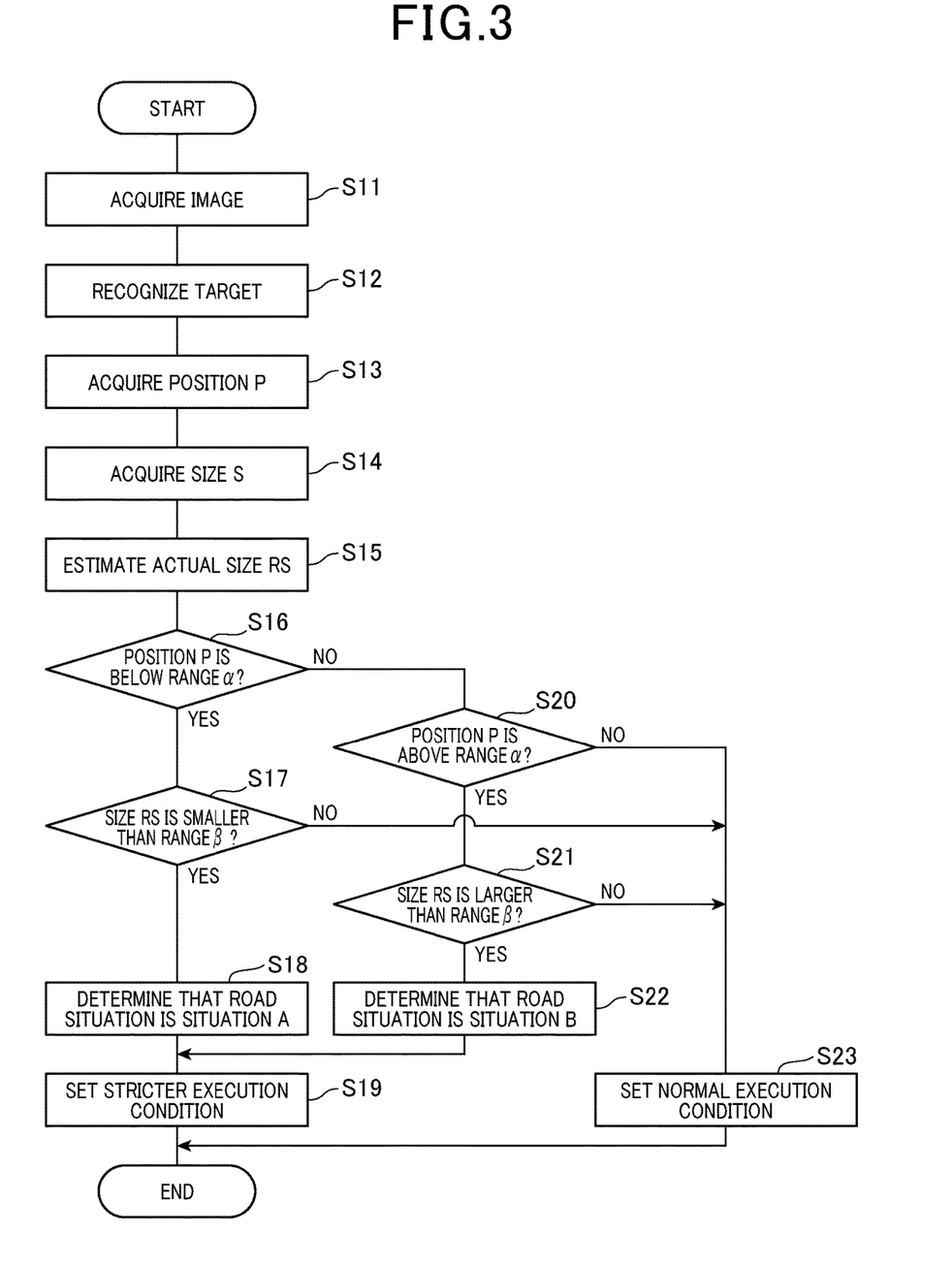
FIG. 3 is a flowchart showing a condition setting process which is executed by the collision avoidance assistance device 1.

In step S12, the image recognition unit 19 recognizes, by using a well-known image recognition technique, a target in the image acquired in the step S11.

Figure 4:
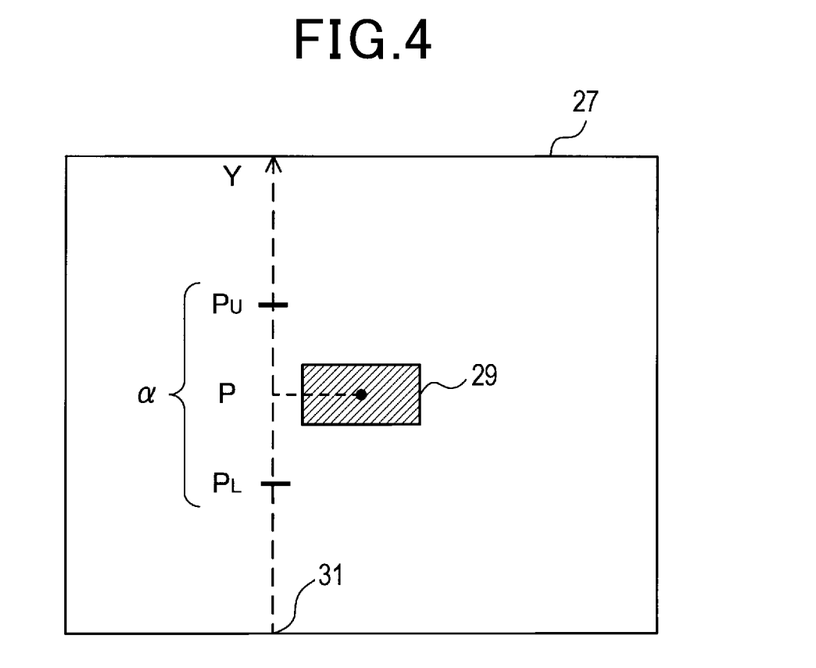
FIG. 4 is an explanatory diagram illustrating a position P of a target 29 and a range $\alpha$ in an image 27.

In step S13, the position P acquisition unit 21 acquires a position P, in the vertical direction in the image acquired in the step S11, of the target recognized in the step S12. With reference to FIG. 4, this process will be specifically described below. In FIG. 4, a reference sign 27 indicates the image acquired in the step S11 and a reference sign 29 indicates the target recognized in the step S12. A y-axis indicates an axis in the vertical direction in the image 27. The position P indicates a coordinate of the target 29 on the y-axis. The position P is a position relative to a fixed point (e.g., lower end) in the image 27.

Figure 5A:
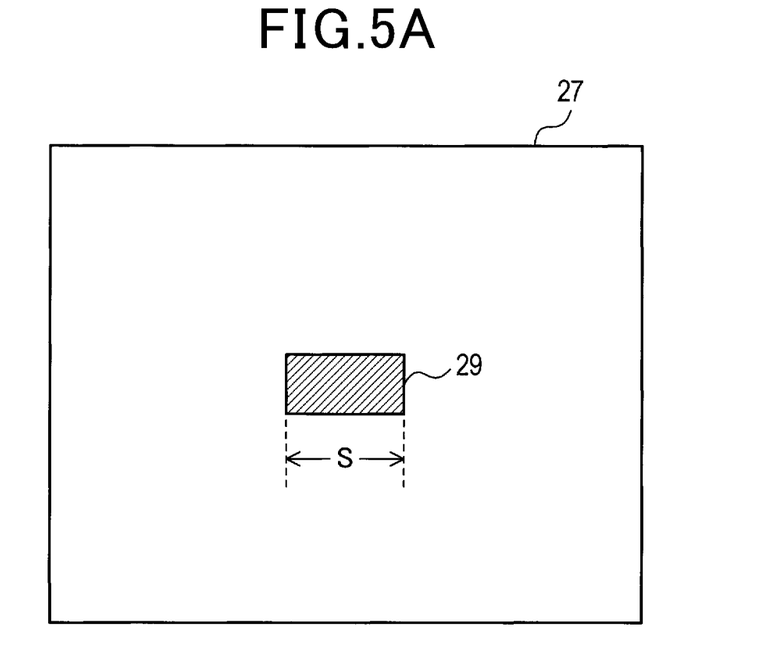
FIG. 5A is an explanatory diagram illustrating a size S of the target 29 in a lateral direction in the image 27.

Again, with reference to FIG. 3, in step S14, the size RS estimation unit 23 first acquires a size S, in the image, of the target recognized in the step S12. As illustrated in FIG. 5A, the size S is an apparent size of the target 29 in a lateral direction in the image 27 (size expressed as the number of pixels in the lateral direction in the image 27).

Figure 5B:
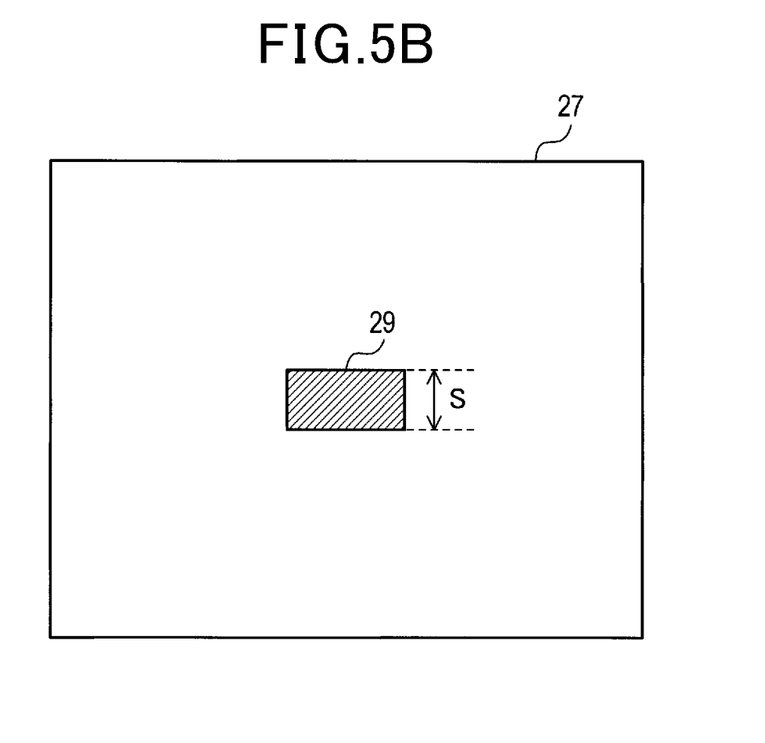
FIG. 5B is an explanatory diagram illustrating a size S of the target 29 in a longitudinal direction in the image 27.

As illustrated in FIG. 5B, the size S can be an apparent size of the target 29 in a longitudinal direction in the image 27 (size expressed as the number of pixels in the longitudinal direction in the image 27).

Next, in step S15, the size RS estimation unit 23 estimates, from the size S acquired as described above and the position P acquired in the step S13, an actual size RS of the target recognized in the step S12. The size RS estimation unit 23 makes the estimation as below.

Figure 6:
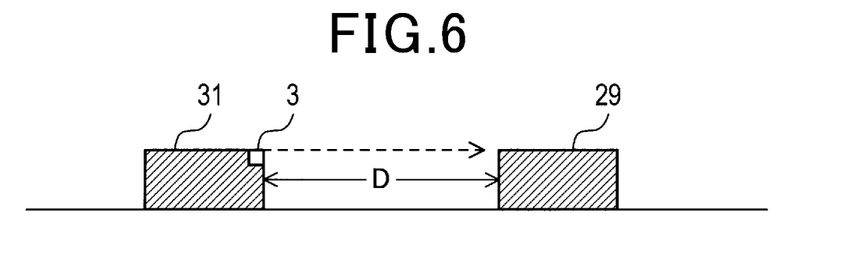
FIG. 6 is an explanatory diagram illustrating an own vehicle 31, the target 29, and a distance D.

Assuming that, as illustrated in FIG. 6, the own vehicle 31 and the target 29 are located on a same flat surface, the distance D from the own vehicle to the target corresponds one-to-one with the position P (as the distance D becomes larger, the position P in the image becomes higher). The size RS estimation unit 23 is provided in advance with a map defining a relationship between the position P and the distance D. The size RS estimation unit 23 calculates the distance D by inputting the position P into the map.

Once the distance D and the size S are determined, the size RS is uniquely determined. The size RS estimation unit 23 is provided in advance with a map defining a relationship of the distance D and the size S with the size RS. The size RS estimation unit 23 estimates the size RS by inputting, into the map, the distance D calculated as described above and the size S acquired in the step S14.

In step S16, the execution condition setting unit 25 determines whether, in the image acquired in the step S11, the position P acquired in the step S13 is below a range α which is set in advance. As illustrated in FIG. 4, the range α is a range of positions in the vertical direction which region is set in the image 27 acquired in the step S11. The range α has a lower limit $P_L$ and an upper limit $P_U$. In the case where the position P is below the lower limit $P_L$ in the image 27, the position P is below the range α in the image acquired in the step S11. The range α is a range that the position P can take in the case where, as illustrated in FIG. 6, the own vehicle 31 and the target 29 are located on the same flat surface. In the case where the position P is below the range α in the image acquired in the step S11, the process proceeds to step S17. Otherwise the process proceeds to step S20.

In the step S17, the execution condition setting unit 25 determines whether the size RS estimated in the step S15 is smaller than a range β which is set in advance. The range β is a range of the size RS that a specific type of target can have. For example, the range β for a vehicle which is an example of the type of target can be set to 1.3 m to 2.5 m. In the case where the size RS is smaller than a lower limit value (1.3 m in the above example) of the range β, the size RS is smaller than the range β. In the case where the size RS is smaller than the range β, the process proceeds to step S18. Otherwise the process proceeds to step S23.

Figure 7:
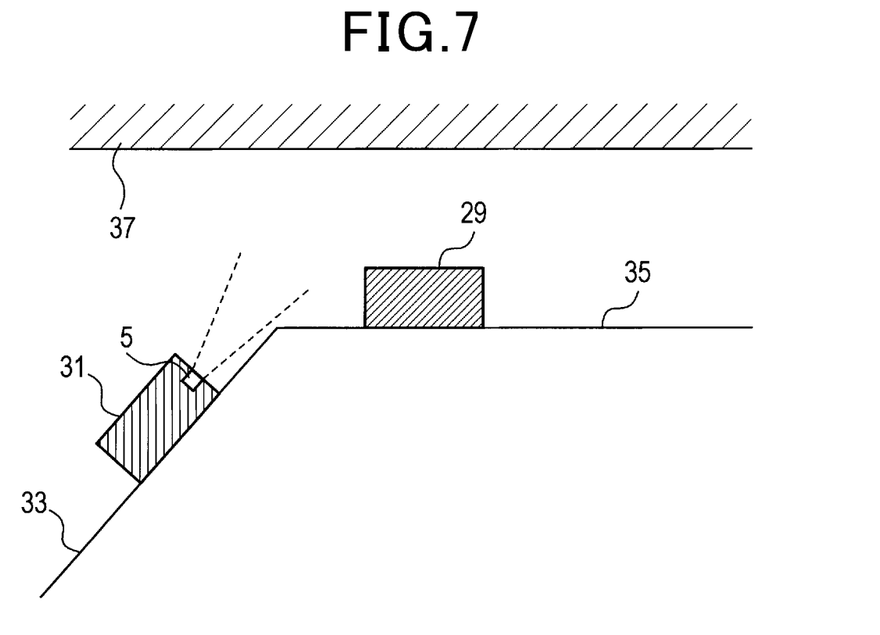
FIG. 7 is an explanatory diagram illustrating a positional relationship among the own vehicle 31, the target 29, and an overhead structure 37 in a situation A.

In the step S18, the execution condition setting unit 25 determines that a situation of a road around the own vehicle is a situation A illustrated in FIG. 7. The situation A is a situation where a mountain (ridge) shape is formed by a surface 33 on which the own vehicle 31 is present and a surface 35 on which the target 29 ahead of the own vehicle 31 is present. Examples of the situation A include the case where the surface 33 is uphill and the surface 35 is horizontal, the case where the surface 33 is horizontal and the surface 35 is downhill, and the case where the surface 33 is uphill and the surface 35 is downhill. The above case where the surface 33 is uphill or the surface 35 is downhill indicates the case where the surface 33 is uphill or the surface 35 is downhill for the own vehicle.

In the case of the situation A, the position P is low, so that an affirmative determination is made in the step S16. Since the position P is low, the distance D is calculated to be smaller than an actual distance. Consequently, the size RS is estimated to be smaller than an actual size. Thus, an affirmative determination is made in the step S17.

In step S19, the execution condition setting unit 25 sets the execution condition to be stricter than normal. Specifically, in the execution condition that "when TTC is acquired multiple times, the rate r of acquisition of TTC whose value is not more than the reference value I is not less than the rate threshold R," a value of the rate threshold R is set to $R_2$ which is larger than a normal value $R_1$. The reference value I is a fixed value.

Meanwhile, in the case where a negative determination is made in the step S16, the process proceeds to the step S20, and the execution condition setting unit 25 determines whether, in the image acquired in the step S11, the position P acquired in the step S13 is above the range α which is set in advance. In the case where the position P is above the upper limit $P_U$ (see FIG. 4) in the image acquired in the step S11, the position P is above the range α in the image acquired in the step S11. In the case where the position P is above the range α in the image acquired in the step S11, the process proceeds to step S21. Otherwise the process proceeds to the step S23.

In the step S21, the execution condition setting unit 25 determines whether the size RS estimated in step S15 is larger than the range β which is set in advance. In the case where the size RS is larger than an upper limit value of the range β, the size RS is larger than the range β. In the case where the size RS is larger than the range β, the process proceeds to step S22. Otherwise the process proceeds to the step S23.

Figure 8:
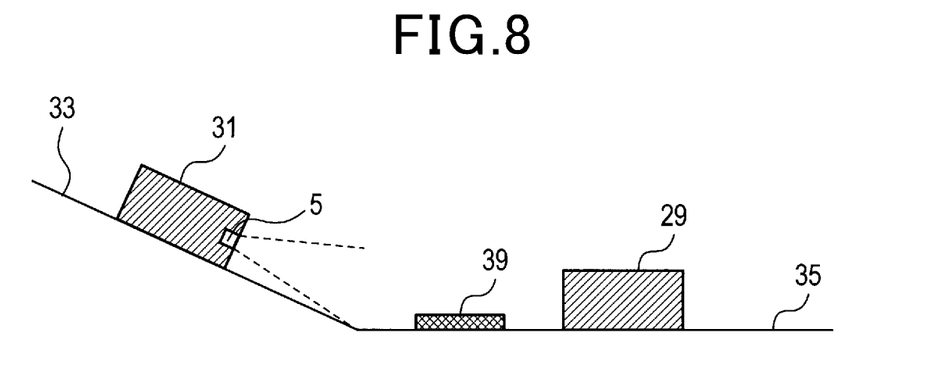
FIG. 8 is an explanatory diagram illustrating a positional relationship among the own vehicle 31, the target 29, and a road structure 39 in a situation B.

In the step S22, the execution condition setting unit 25 determines that a situation of the road around the own vehicle is a situation B illustrated in FIG. 8. The situation B is a situation where a valley shape is formed by the surface 33 on which the own vehicle 31 is present and the surface 35 on which the target 29 ahead of the own vehicle 31 is present. Examples of the situation B include the case where the surface 33 is downhill and the surface 35 is horizontal, the case where the surface 33 is horizontal and the surface 35 is uphill, and the case where the surface 33 is downhill and the surface 35 is uphill.

In the case of the situation B, the position P is high, so that an affirmative determination is made in the step S20. Since the position P is high, the distance D is calculated to be larger than an actual distance. Consequently, the size RS is estimated to be larger than an actual size. Thus, an affirmative determination is made in the step S21.

In the step S23, the execution condition setting unit 25 sets the execution condition to be normal. Specifically, in the execution condition that "when TTC is acquired multiple times, the rate r of acquisition of TTC whose value is not more than the reference value I is not less than the rate threshold R," a value of the rate threshold R is set to the normal value $R_1$. The reference value I is a fixed value.

Making an affirmative determination in the step S16 is an example where a condition J1 is satisfied and making an affirmative determination in the step S17 is an example where a condition J2 is satisfied. Making an affirmative determination in the step S20 is an example where a condition J3 is satisfied and making an affirmative determination in the step S21 is an example where a condition J4 is satisfied.

3. Effects Yielded by Collision Avoidance Assistance Device 1

(1A) In the situation A, as illustrated in FIG. 7, an overhead structure 37 may be present in a front direction of the own vehicle 31. The overhead structure 37 is a structure (e.g., sign, bridge, or the like) under which the own vehicle can pass. In the case where the overhead structure 37 is present, the millimeter wave radar 5 detects the overhead structure 37. However, in the case of the situation A, the collision avoidance assistance device 1 sets the execution condition to be stricter than normal. Accordingly, even in the case where the overhead structure 37 is detected, it is possible to suppress execution of the collision avoidance assistance process with respect to the overhead structure 37 thus detected.

(1B) In the situation B, as illustrated in FIG. 8, a road structure 39 (e.g., manhole cover or the like) may be present in the front direction of the own vehicle 31. In such a case, the millimeter wave radar 5 detects the road structure 39. However, in the case of the situation B, the collision avoidance assistance device 1 sets the execution condition to be stricter than normal. Accordingly, even in the case where the road structure 39 is detected, it is possible to suppress execution of the collision avoidance assistance process with respect to the road structure 39 thus detected.

(1C) According to the collision avoidance assistance device 1, the execution condition is a condition that "when TTC is acquired multiple times, the rate r of acquisition of TTC whose value is not more than the reference value I is not less than the rate threshold R." Thus, it is possible to appropriately determine whether to execute the collision avoidance assistance process.

(1D) According to the collision avoidance assistance device 1, in the step S19, the execution condition is set to be stricter by setting the rate threshold R to a value larger than the normal value. Thus, it is possible to easily change strictness of the execution condition.

(1E) According to the collision avoidance assistance device 1, the automatic braking is performed as the collision avoidance assistance process. Thus, safety of the own vehicle is increased.

Other Embodiments

The foregoing descriptions have discussed the embodiment of the present invention. However, the present invention is not limited to the embodiment described above and can take various forms.

(1) The execution condition can be a condition that "TTC is not more than a predetermined time threshold T." In this case, in the step S19, the execution condition setting unit 25 sets the time threshold T to a value $T_2$ which is smaller than a normal value $T_1$. Furthermore, in the step S23, the execution condition setting unit 25 sets the time threshold T to the normal value $T_1$.

In the case where the execution condition is the content described above and is set in a manner described above, the collision avoidance assistance device 1 can yield effects (2A) and (2B) below, in addition to the effects (1A), (1B), and (1E).

(2A) According to the collision avoidance assistance device 1, since the execution condition is the condition described above, it is possible to appropriately determine whether to execute the collision avoidance assistance process.

(2B) According to the collision avoidance assistance device 1, in the step S19, the execution condition is set to be stricter by setting the time threshold T to a value smaller than the normal value $T_1$. Thus, it is possible to easily change the strictness of the execution condition.

(2) According to the collision avoidance assistance device 1, it is possible to detect a target by another means (e.g., stereo camera, lidar, or the like) instead of using the millimeter wave radar 5.

(3) According to the collision avoidance assistance device 1, it is possible to execute another collision avoidance assistance process (e.g., brake assist, automatic steering, alarm process, or the like) instead of, or in addition to the automatic braking.

(4) According to the collision avoidance assistance device 1, the process in the step S19 is executed in the case where the situation of the road is determined to be the situation A, but otherwise (including the case of the situation B) the process in the step S19 does not need to be executed. Alternatively, according to the collision avoidance assistance device 1, the process in the step S19 is executed in the case where the situation of the road is determined to be the situation B, but otherwise (including the case of the situation A) the process in the step S19 does not need to be executed.

(5) According to the collision avoidance assistance device 1, it is possible to set in the step S19 a value smaller than the normal value as the value of the reference value I and set in the step S23 the normal value as the value of the reference value I. In this case, the value of the rate threshold R can be a fixed value, or it is possible to set in the step S19 a value larger than the normal value as the value of the rate threshold R.

(6) According to the embodiment, it is possible to distribute functions of a single component as a plurality of components or integrate functions of a plurality of components as a single component. At least part of the configuration of the embodiment may be substituted by a publicly known configuration having a similar function. A part of the configuration of the embodiment may be omitted. At least part of the configuration of the embodiment may be added to or substituted by another configuration of the embodiment. Any aspect included in a technical idea specified only by the text of the claims is an embodiment of the present invention.

(7) Other than the collision avoidance assistance device described above, the present invention can be realized in various forms such as a system constituted by the collision avoidance assistance device, a program for allowing a computer to function as the control ECU or the brake ECU of the collision avoidance assistance device, a media storing the program, and a collision avoidance assistance method.

REFERENCE SIGNS LIST

1 . . . Collision avoidance assistance device, 3 . . . Image sensor, 5 . . . Millimeter wave radar, 7 . . . Control ECU, 9 . . . Brake ECU, 11 . . . Target detection unit, 13 . . . Determination unit, 15 . . . Process execution unit, 17 . . . Image acquisition unit, 19 . . . Image recognition unit, 21 . . . Position P acquisition unit, 23 . . . Size RS estimation unit, 25 . . . Execution condition setting unit, 27 . . . Image, 29 . . . Target, 31 . . . Own vehicle, 33, 35 . . . Surface, 37 . . . Overhead structure, 39 . . . Road structure

The invention claimed is:
1. A collision avoidance assistance device comprising:
a target detection unit for detecting a target ahead of a vehicle provided with the collision avoidance assistance device;
a determination unit for determining whether the target which has been detected by the target detection unit satisfies a predetermined execution condition;
a process execution unit for executing a collision avoidance assistance process in a case where the determination unit determines that the target satisfies the execution condition;
an image acquisition unit for acquiring an image ahead of the vehicle;
an image recognition unit for recognizing the target in the image;
a position P acquisition unit for acquiring a position P, in a vertical direction in the image, of the target which has been recognized by the image recognition unit;
a size RS estimation unit for estimating, from the position P and a size S in the image of the target which has been recognized by the image recognition unit, an actual size RS of the target which has been recognized by the image recognition unit; and
an execution condition setting unit for determining whether the following conditions are respectively satisfied:
(Condition J1) in the image, the position P is below a range α of positions in the vertical direction in the image which range α is set in advance;
(Condition J2) the size RS is smaller than a range β whose size is set in advance;

(Condition J3) in the image, the position P is above the range α; and
(Condition J4) the size RS is larger than the range β, and setting the execution condition that:
  makes it more difficult for the process execution unit to execute the collision avoidance assistance process in a first case than to execute the collision avoidance assistance process in a second case,
    the first case representing that the conditions J1 and J2 are both satisfied,
    the second case representing that at least one of the conditions J1 and J2 is not satisfied; and
  makes it more difficult for the process execution unit to execute the collision avoidance assistance process in a third case than to execute the collision avoidance assistance process in a fourth case,
    the third case representing that the conditions J3 and J4 are both satisfied,
    the fourth case representing that at least one of the conditions J3 and J4 is not satisfied.

2. The collision avoidance assistance device according to claim 1 wherein the execution condition is a condition that time to collision of the target is not more than a predetermined time threshold or a condition that when the time to collision is acquired multiple times, a rate of acquisition of time to collision whose value is not more than a reference value is not less than a predetermined rate threshold.

3. The collision avoidance assistance device according to claim 2 wherein: the execution condition setting unit is configured to:
  set the time threshold in the first case to be smaller than the time threshold in the second case;
  set the time threshold in the third case to be smaller than the time threshold in the fourth case;
  set the rate threshold in the first case to be larger than the rate threshold in the second case; and
  set the rate threshold in the third case to be larger than the rate threshold in the fourth case.

4. The collision avoidance assistance device according to claim 1 wherein the target detection unit detects a target with the use of a millimeter wave radar.

5. The collision avoidance assistance device according to claim 1 wherein the collision avoidance assistance process is one or more of brake assist, automatic braking, automatic steering, and an alarm process.

6. The collision avoidance assistance device according to claim 2 wherein the target detection unit detects a target with the use of a millimeter wave radar.

7. The collision avoidance assistance device according to claim 3 wherein the target detection unit detects a target with the use of a millimeter wave radar.

8. The collision avoidance assistance device according to claim 2 wherein the collision avoidance assistance process is one or more of brake assist, automatic braking, automatic steering, and an alarm process.

9. The collision avoidance assistance device according to claim 3 wherein the collision avoidance assistance process is one or more of brake assist, automatic braking, automatic steering, and an alarm process.

10. A method for providing collision avoidance assistance to a vehicle comprising:
  detecting a target ahead of the vehicle;
  determining whether the target which has been detected satisfies a predetermined execution condition;
  executing a collision avoidance assistance process in response to determining that the target satisfies the execution condition;
  acquiring an image ahead of the vehicle;
  recognizing the target in the image;
  acquiring a position P, in a vertical direction in the image, of the target;
  estimating, from the position P and a size S in the image of the target, an actual size RS of the target;
  determining whether the following conditions are respectively satisfied:
    (Condition J1) in the image, the position P is below a range α of positions in the vertical direction in the image which range α is set in advance;
    (Condition J2) the size RS is smaller than a range β whose size is set in advance;
    (Condition J3) in the image, the position P is above the range α; and
    (Condition J4) the size RS is larger than the range β; and
  setting the execution condition to:
    increase a threshold to execute the collision avoidance assistance process in a first case than to execute the collision avoidance assistance process in a second case,
      the first case representing that the conditions J1 and J2 are both satisfied,
      the second case representing that at least one of the conditions J1 and J2 is not satisfied; and
    increase a threshold to execute the collision avoidance assistance process in a third case than to execute the collision avoidance assistance process in a fourth case,
      the third case representing that the conditions J3 and J4 are both satisfied,
      the fourth case representing that at least one of the conditions J3 and J4 is not satisfied.

11. A system for providing collision avoidance assistance to a vehicle comprising:
  a central processor;
  a non-transitory computer-readable storage medium; and
  a set of computer-executable instructions stored on the computer-readable storage medium that cause the central processor to implement:
    detecting a target ahead of the vehicle;
    determining whether the target which has been detected satisfies a predetermined execution condition;
    executing a collision avoidance assistance process in response to determining that the target satisfies the execution condition;
    acquiring an image ahead of the vehicle;
    recognizing the target in the image;
    acquiring a position P, in a vertical direction in the image, of the target;
    estimating, from the position P and a size S in the image of the target, an actual size RS of the target;
    determining whether the following conditions are respectively satisfied:
      (Condition J1) in the image, the position P is below a range α of positions in the vertical direction in the image which range α is set in advance;
      (Condition J2) the size RS is smaller than a range β whose size is set in advance;
      (Condition J3) in the image, the position P is above the range α; and
      (Condition J4) the size RS is larger than the range β; and setting the execution condition to:
   increase a threshold to execute the collision avoidance assistance process in a first case than to execute the collision avoidance assistance process in a second case,
      the first case representing that the conditions J1 and J2 are both satisfied,
      the second case representing that at least one of the conditions J1 and J2 is not satisfied; and
   increase a threshold to execute the collision avoidance assistance process in a third case than to execute the collision avoidance assistance process in a fourth case,
      the third case representing that the conditions J3 and J4 are both satisfied,
      the fourth case representing that at least one of the conditions J3 and J4 is not satisfied.

* * * * *